US011477630B2

(12) United States Patent
Su et al.

(10) Patent No.: US 11,477,630 B2
(45) Date of Patent: Oct. 18, 2022

(54) RADIO SYSTEM AND RADIO NETWORK GATEWAY THEREOF

(71) Applicant: Alpha Networks Inc., Hsinchu (TW)

(72) Inventors: Shih Chieh Su, Hsinchu (TW); Yi Peng Cheng, Hsinchu (TW); Chia Ying Yang, Hsinchu (TW)

(73) Assignee: ALPHA NETWORKS INC., Hsinchu (TW)

(*) Notice: Subject to any disclaimer, the term of this patent is extended or adjusted under 35 U.S.C. 154(b) by 101 days.

(21) Appl. No.: 17/111,959

(22) Filed: Dec. 4, 2020

(65) Prior Publication Data

US 2022/0124473 A1    Apr. 21, 2022

(30) Foreign Application Priority Data

Oct. 16, 2020    (TW) .................................. 109136050

(51) Int. Cl.
*H04W 4/90* (2018.01)
*G10L 15/22* (2006.01)
(Continued)

(52) U.S. Cl.
CPC ............... *H04W 4/90* (2018.02); *G10L 15/22* (2013.01); *H04B 7/15* (2013.01); *H04W 88/16* (2013.01)

(58) Field of Classification Search
CPC ....... H04B 1/0003; H04L 1/0014; H04L 1/20; H04L 65/1033; H04L 65/4061;
(Continued)

(56) References Cited

U.S. PATENT DOCUMENTS

2014/0294180 A1*  10/2014  Link, II .................... H04L 9/30
                                                                380/270
2015/0199965 A1*  7/2015   Leak ....................... G10L 15/22
                                                                704/249
(Continued)

FOREIGN PATENT DOCUMENTS

CN        105609104        5/2016
CN        105794188        7/2016
(Continued)

OTHER PUBLICATIONS

"Integration of an Advanced Emergency Call Subsystem into a Car-Gateway Platform"; Madrid et al.; 2009 Design, Automation & Test in Europe Conference & Exhibition (Year: 2009).*
(Continued)

*Primary Examiner* — Benjamin H Elliott, IV
(74) *Attorney, Agent, or Firm* — WPAT, PC

(57) ABSTRACT

A radio system includes a radio voice terminal, a relay server, a command center and a radio network gateway. The radio network gateway includes a communication module in communication with the relay server; a radio voice control module in communication with the first radio voice terminal, receiving a radio voice signal from the first radio voice terminal; and a processing module in communication with the communication module and the radio voice control module, converting the radio voice signal into a digital voice file, executing a voice recognition process to extract at least one keyword from the digital voice file, and transmitting the at least one keyword to the relay server through the communication module.

16 Claims, 3 Drawing Sheets

(51) Int. Cl.
  *H04B 7/15* (2006.01)
  *H04W 88/16* (2009.01)

(58) Field of Classification Search
  CPC ........ H04W 4/90; H04W 88/16; G10L 15/02;
              G10L 15/04; G10L 2015/088; G10L
              15/16; G10L 15/20; G10L 15/22
  See application file for complete search history.

(56) References Cited

U.S. PATENT DOCUMENTS

| | | | |
|---|---|---|---|
| 2016/0285872 A1* | 9/2016 | Polar | H04L 67/06 |
| 2017/0222866 A1 | 8/2017 | Wang | |
| 2017/0322924 A1 | 11/2017 | Takano | |
| 2018/0123821 A1* | 5/2018 | Alberth, Jr. | H04W 4/024 |
| 2018/0146042 A1* | 5/2018 | Choi | G10L 15/26 |
| 2018/0308483 A1* | 10/2018 | Myoung | G10L 15/30 |
| 2018/0308490 A1* | 10/2018 | Lim | G10L 15/30 |
| 2018/0310159 A1* | 10/2018 | Katz | H04M 3/5116 |
| 2019/0103100 A1* | 4/2019 | Rozen | G10L 15/30 |
| 2020/0243071 A1* | 7/2020 | Park | G10L 15/063 |
| 2021/0157536 A1* | 5/2021 | Sugawara | G06F 3/167 |
| 2021/0160675 A1* | 5/2021 | Perry | H04W 4/90 |
| 2022/0022008 A1* | 1/2022 | Butler | H04M 3/567 |
| 2022/0124473 A1* | 4/2022 | Su | H04B 7/15 |
| 2022/0159127 A1* | 5/2022 | Su | H04W 84/08 |

FOREIGN PATENT DOCUMENTS

| | | |
|---|---|---|
| TW | 201722113 | 6/2017 |
| TW | 201729565 | 8/2017 |

OTHER PUBLICATIONS

"Disaster and Emergency Management System"; Chen et al.; The 15th International Symposium on Wireless Personal Multimedia Communications; 2012 (Year: 2012).*

TW OA issued on Oct. 7, 2021.

* cited by examiner

FIG. 1 (PIROR ART)

RADIO SYSTEM AND RADIO NETWORK GATEWAY THEREOF

FIELD OF THE INVENTION

The present invention relates to a radio system, and particularly to a radio system for use with an emergency announcement system. The present invention also relates to a radio network gateway of the radio system.

BACKGROUND OF THE INVENTION

The police and firefighting units frequently use radio systems to communicate when they are on duty. As shown in FIG. 1, which is a schematic diagram of a conventional radio communication system, a radio walkie-talkie 100 is generally used by the police or firefighters at the scene. The radio walkie-talkie 100 transmits analog voice signals to radio relay stations 102 located at high places through a first mobile radio relay device 101, and the analog voice signals are then forwarded to a remote second mobile radio relay device 103 before arriving at the command center 104. It can be seen that such a system relies on the radio relay stations 102 built on vantage points to complete the communication network connection. Unfortunately, in metropolitan areas where a lot of high-rise buildings are located, the buildings likely hinder the communication signals from reaching many places such as narrow lanes so as to form blind spots, causing radio communication to be interrupted. As a result, deployment instructions cannot be timely conveyed, and event situations cannot be timely updated. The rescue and relief work might be adversely affected.

SUMMARY OF THE INVENTION

Therefore, the present invention provides a radio system and a radio network gateway thereof, which work to minimize blind spots for radio communication in an emergency announcement system.

In an aspect of the present invention, a radio system includes a radio voice terminal, a relay server, a command center and a radio network gateway. The radio network gateway includes a communication module in communication with the relay server; a radio voice control module in communication with the first radio voice terminal, receiving a radio voice signal from the first radio voice terminal; and a processing module in communication with the communication module and the radio voice control module, converting the radio voice signal into a digital voice file, and transmitting the digital voice file through the communication module to the relay server, which executes a voice recognition process to extract at least one keyword from the digital voice file, and transmitting the at least one keyword to the command center.

In another aspect of the present invention, a radio system includes a radio voice terminal, a relay server, at least one sensor, a command center, and a radio network gateway. The radio network gateway includes a communication module in communication with the relay server, receiving therethrough sensing data collected from the at least one sensor; a radio voice control module in communication with the radio voice terminal, receiving a radio voice signal from the radio voice terminal; and a processing module in communication with the communication module and the radio voice control module, processing and transmitting the collected data through the communication module to the relay server, which issues a signal responsive to the processed collected data to the command center.

The present invention further provides a radio system, in which one of the above described radio network gateways is used.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
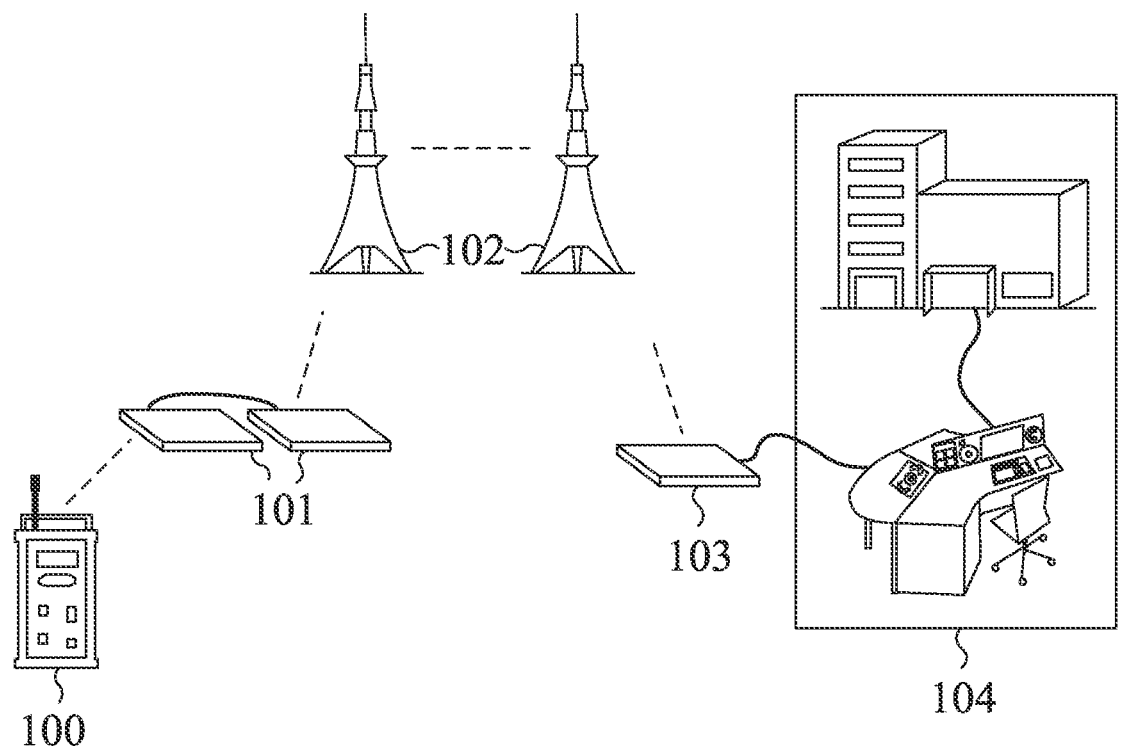
FIG. 1 is a scheme illustrating a conventional radio system for use with an emergency announcement system.
Figure 2:
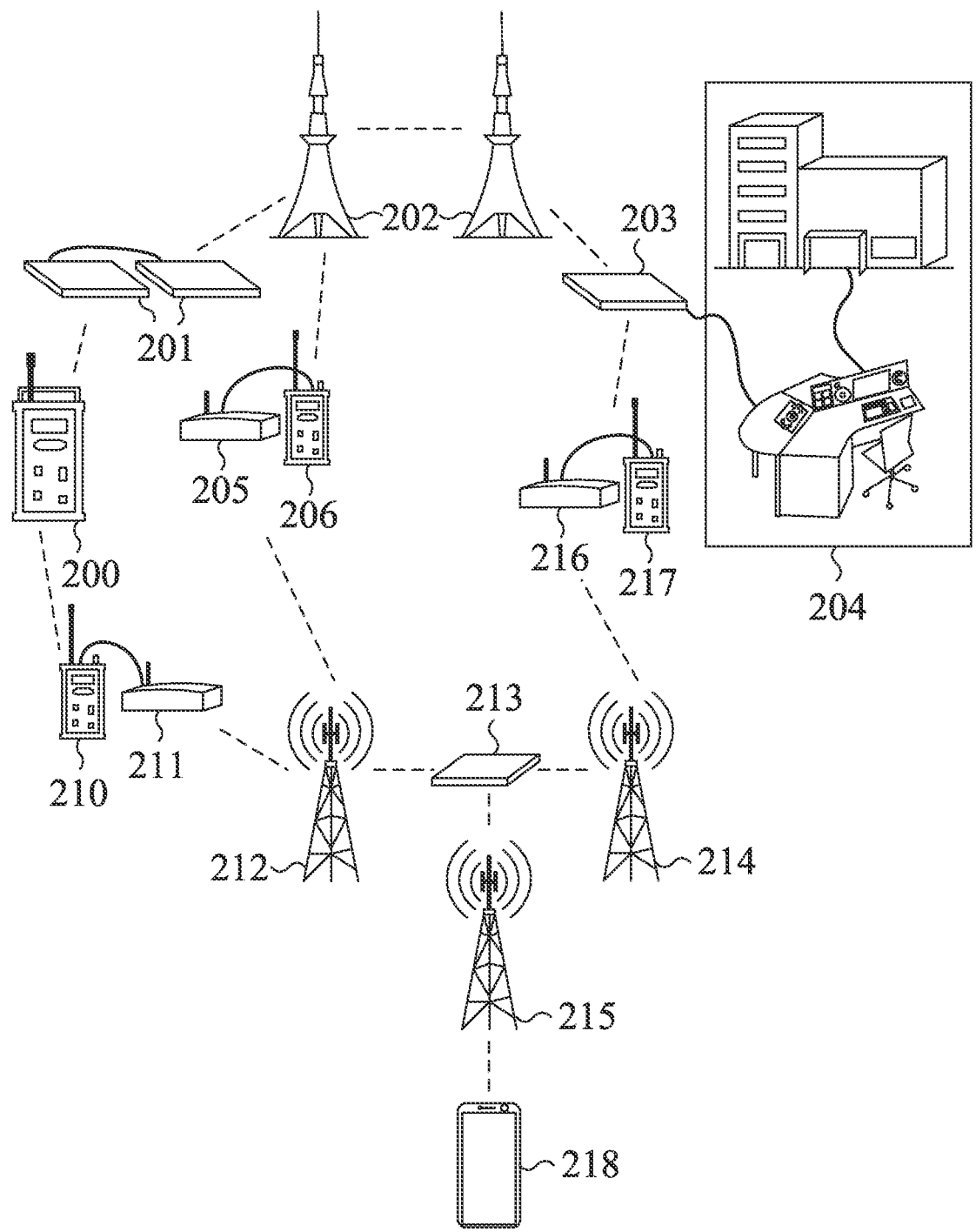
FIG. 2 is a scheme illustrating a radio system adapted to be used with an emergency announcement system according to an embodiment of the present invention.

An embodiment of radio system according to the present invention is illustrated hereinafter with reference to FIG. 2. A walkie-talkie 200 used by on-site personnel such as police and firefighters can transmit radio voice signals through at least two kinds of channels, one of which is a conventional analog communication channel for radio voice signal transmission. A first mobile radio relay device 201 transmits a radio voice signal to one or more radio relay stations 202 located at high places, and the radio voice signal is then forwarded to a second mobile radio relay device 203 in a remote place. Subsequently, the radio voice signal would reach the command center 204. Once the radio voice signal transmission through the above-described channel is interrupted due to a blind spot, another channel can be used for radio voice signal transmission according to the present invention.

Through the alternative kind of channel, the radio voice signal transmission can be conducted as follows. A first frequency-pairing radio transceiver 210 receives the radio voice signal from the walkie-talkie 200, and transfers it to a first radio network gateway 211 to convert the radio voice signal into a digital voice signal. Subsequently, the digital voice signal is transmitted to a first mobile communication base station 212 and then optionally to other mobile communication base stations 214 and 215 through a relay server 213. Another wireless network communication device such as a mobile phone 218 and a second radio network gateway 216 can thus receive the digital voice signal, and the second radio network gateway 216 converts the received digital voice signal back into a radio voice signal through a second frequency-pairing radio transceiver 217. The radio voice signal is then transmitted to a second mobile radio relay device 203, and finally transmitted to the command center 204. Of course, the digital voice signal transmitted from the first radio network gateway 211 may further be transmitted to a third radio network gateway 205 through the first mobile communication base station 212, and through the third radio network gateway 205, the received digital voice signal is transmitted to the one or more radio relay stations 202 located high to detour from blind spots.

Figure 3:
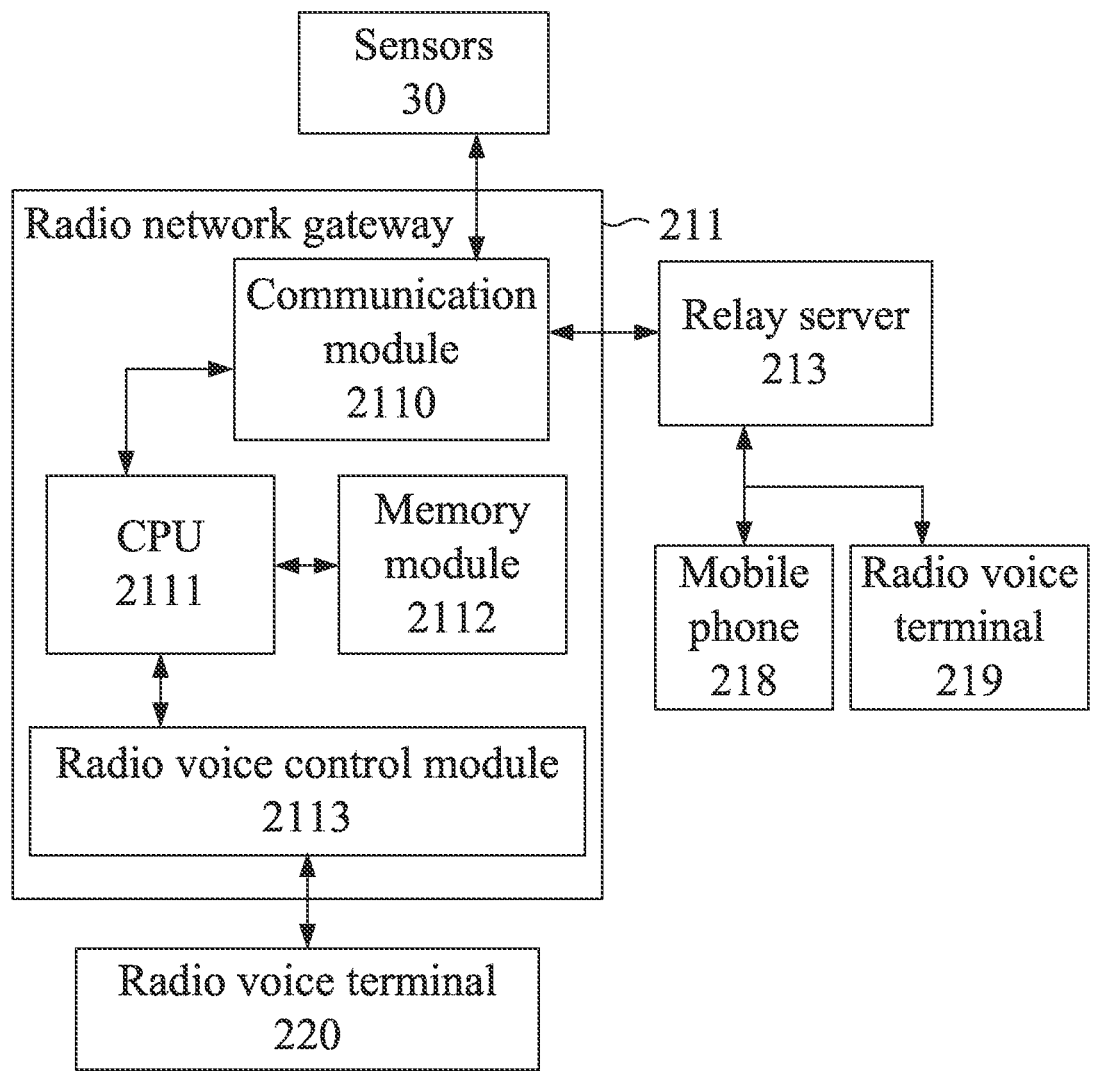
FIG. 3 is a functional block diagram schematically illustrating an embodiment of a radio network gateway used in the radio system of FIG. 2 according to the present invention.

Hereinafter, the first radio network gateway 211 is described in more detail with reference to FIG. 3. The first radio network gateway 211 includes a communication module 2110, a central processing unit 2111, a memory module 2112 and a radio voice control module 2113. The communication module 2110 is adapted to be in communication with an external sensor 30 and a relay server 213. The communication module 2110 may communicate with the relay server 213 via a mobile communication network such as the first mobile communication base station 212 shown in FIG. 2, or a fixed network (not shown). Voice signals can be transmitted between the relay server 213 and the mobile phone 218 and/or a radio voice terminal 219.

The first radio network gateway 211 can be used as an intelligent action command station, which is directly installed on a firefighting vehicle or a police car and use a power supply of the vehicle on duty. The radio voice control module 2113 can automatically pair with radio devices of the fire brigade or police force with a consistent operational frequency band to receive or send radio voice signals. This allows the on-site fire commander to keep in touch with the command center at any time.

The communication module 2110 may communicate with a variety of types of external sensor 30 including, for example, water level sensors, image sensors, pressure sensors, or combinations thereof. The data and/or images are collected from the external sensor 30 are transmitted to the central processing unit 2111 and an operating system and an application programs stored in the memory module 2112 through the communication module 2110. By processing the collected data, multiple conditions e.g. a currently available current water level detected by the water level sensor, an allocation state of equipment detected by the image sensor and a residual volume of air detected by the pressure sensor, can be realized so that necessary actions can be timely taken.

Meanwhile, the radio voice control module 2113 receives the radio voice signal from a radio voice terminal 220, for example, via a coaxial signal line or Ethernet, and forwards the radio voice signal to the central processing unit 2111 for subsequent processing. For example, the central processing unit 2111 can record the radio voice signal as a digital voice file, store it in the memory module 2112 and/or upload it to the command center 204 for backup. Desirably, the voice data are automatically and continuously retransmitted even when the communication is interrupted.

Preferably, the central processing unit 2111 and the application program stored in the memory module 2112 process the digital voice signal converted from the radio voice signal to perform voice recognition and learning, and extracts at least one keyword from the contents of the digital voice signal. Then the at least one keyword as well as the digital voice signal are transmitted to the relay server 213 and the remote command center 204 through the communication module 2110 and the mobile communication network. Furthermore, task codes are frequently used in the firefighters' conversations to simplify or specify tasks. For example, a code "123" represents "fire", a code "456" represents "emergency medical care", and a code "789" represents "chemical vehicle dispatch". Therefore, voice recognition technology can be used to automatically derive keywords based on the task code occurring in the call. The at least one keyword is then transmitted to the command center 204 or any other associated unit by way of an online instant messaging software. Meanwhile, a necessary action corresponding to the task code or the at least one keyword may be taken. For example, alarms and/or commands, e.g. dispatching a chemical disaster relief vehicle, may be automatically issued to the command center 204 and/or related authorities. In this way, both the rescuers rushing to the scene and the disaster relief commander at the command center 204 can be synchronously updated with the latest disaster relief information and disaster location (by way of GPS), which are selectively displayed on the mobile phone 218 installed with the specific application program, another wireless network communication device (not shown) installed with an application program collaborating with the specific application program of the mobile phone 218, and a computer located in the command center 204 and installed with an application program collaborating with the specific application program of the mobile phone 218, respectively. The timely acquisition of disaster situation facilitates quick and accurate instructions and support.

In the above embodiments, the radio voice terminal 219 may be a radio voice device commonly available in the fire brigade or police force, e.g. a radio walkie-talkie or a radio intercom, while the mobile phone 218 can issue both a text message and a voice message. With the above-mentioned application program or another application program, depending on practical designs, the mobile phone 218 allows the voice message to be sent in a form of radio voice signal via a designated route, i.e. from the mobile phone 218 to the command center 204 through the radio network gateway 211. For assuring of accurate information, the radio network gateway 211 may check the consistency between the voice message and the text message. On the other hand, the command center 204 can also send a voice message to the radio walkie-talkie 200, the radio walkie-talkie 219 and/or the mobile phone 218 accessible to the on-site personnel. The voice message would be transmitted through the radio network gateway 211 and the relay server 213.

Furthermore, according to the present invention, it is preferable that a voice source issuing a task code, if any, is automatically identified so that related information facilitating disaster relief can be automatically generated for reference, thereby improving the efficiency to execute the task. The locating means of the voice source is conducted by voice recognition mentioned above. For example, accents, pet phrases and/or characteristic tones of the commander and different team leaders may be sampled from their daily life dialogues or by having them read articles and are previously recorded. The central processing unit 2111 and the specific application program stored in the memory module 2112 further conduct a learning process with the backup copy of the radio voice signal, thereby enhancing subsequent voice recognition accuracy.

In the above embodiments, the sensor-data collecting and analyzing operation and the voice recognizing operation are executed by the central processing unit 2111 and the specific application program stored in the memory module 2112 of the first radio network gateway 211. Alternatively, these operations may also be performed by combined software and hardware of the relay server 213 depending on hardware resources of the system.

It is to be noted that the expression "module" used above may be implemented with hardware, firmware or software, which can be readily designed and modified by those skilled in the art based on the disclosure of the above embodiments and depending on practical requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A radio network gateway adapted to be used in a firefighting or police radio system, the radio network gateway comprising:
a radio voice control module automatically pairing with a radio device of a fire brigade or police force with a consistent operational frequency band to receive a radio voice signal from a first radio voice terminal;
a processing module receiving the radio voice signal from the radio voice control module, converting the radio voice signal into a digital voice file, and executing a voice recognition process to extract at least one keyword from the digital voice file; and
a communication module receiving the at least one keyword from the processing module, and outputting the at least one keyword to a relay server of the firefighting or police radio system via a mobile communication network.

2. The radio network gateway according to claim 1, wherein the processing module includes a central processing unit and a memory module, in which a first application program is stored, and the at least one keyword is extracted by the first application program and transmitted from the communication module to the relay server together with the digital voice file via the mobile communication network.

3. The radio network gateway according to claim 2, wherein the central processing unit and the first application program performs machine learning of the digital voice file based on input voice to enhance identification accuracy of the at least one keyword.

4. The radio network gateway according to claim 2, wherein the central processing unit stores the digital voice file in the memory module and/or upload the digital voice file to a command center of the firefighting or police radio system for backup, and the digital voice file are automatically and continuously retransmitted during interruption of communication.

5. The radio network gateway according to claim 1, wherein the communication module is adapted to communicate with at least one external sensor for transmitting therethrough data collected from the at least one external sensor to the processing module to be processed, and transfers a signal responsive to the processed collected data from the processing module to the relay server.

6. A radio system, comprising:
a first radio voice terminal;
a relay server;
a command center; and
a radio network gateway in communication with the radio voice terminal, the relay server, and the command center, comprising:
a communication module in communication with the relay server;
a radio voice control module in communication with the first radio voice terminal, receiving a radio voice signal from the first radio voice terminal;
a processing module in communication with the communication module and the radio voice control module, converting the radio voice signal into a digital voice file, and transmitting the digital voice file through the communication module to the relay server, which executes a voice recognition process to extract at least one keyword from the digital voice file, and transmitting the at least one keyword to the command center, and
a wireless network communication device in communication with the relay server, wherein the wireless communication device is installed with a second application program, by which a voice message from the wireless communication device is transmitted in a form of radio voice signal to the command center through the radio network gateway, in which the at least one keyword is extracted.

7. The radio system according to claim 6, wherein the relay server includes a central processing unit and a memory module, in which a first application program is stored, and the at least one keyword is extracted from the digital voice file by the first application program, and transmitted to the command center together with the digital voice file via a mobile communication network.

8. The radio system according to claim 7, wherein the central processing unit and the first application program performs machine learning of the digital voice file based on input voice to enhance identification accuracy of the at least one keyword.

9. The radio system according to claim 7, wherein the central processing unit stores the digital voice file in the memory module and/or upload the digital voice file to the command center for backup, and the digital voice file are automatically and continuously retransmitted during interruption of communication.

10. The radio system according to claim 6, further comprising at least one sensor, wherein the communication module is adapted to communicate with the at least one sensor for transmitting therethrough data collected from the at least one sensor to the relay server, which issues a signal responsive to the processed collected data to the command center.

11. The radio system according to claim 6, adapted to be installed on a firefighting vehicle or a police car, wherein the radio voice control module automatically pairs with a radio device of the fire brigade or police force with a consistent operational frequency band to receive or send the radio voice signal.

12. The radio system according to claim 6, wherein the at least one keyword and/or information derived from the at least one keyword is displayed on the wireless network communication device by way of the second application program and/or displayed on another wireless network communication device installed with a third application program collaborating with the second application program.

13. The radio system according to claim 12, wherein the at least one keyword and/or information derived from the at least one keyword is further displayed on a computer of the command center installed by way of a fourth application program collaborating with the second application program.

14. The radio system according to claim 6, wherein the wireless network communication device is a mobile phone.

15. The radio system according to claim 6, wherein the command center further issues another voice message to the wireless network communication device, the first radio voice terminal and/or a second radio voice terminal in communication with the relay server via the radio network gateway.

16. A firefighting or police radio system, comprising:
a first radio network gateway installed on a vehicle on duty;

a first frequency-pairing radio transceiver, receiving a radio voice signal from a radio walkie-talkie, and transmitting the radio voice signal to the first radio network gateway to convert the radio voice signal into a digital voice signal;
a relay server receiving the digital voice signal via a mobile communication network;
a second radio network gateway;
a second frequency-pairing radio transceiver receiving the digital voice signal from the relay server via the mobile communication network, and transmitting the digital voice signal to the second radio network gateway to restore the digital voice signal into the radio voice signal; and
a command center receiving the restored radio voice signal from the second radio network gateway.

\* \* \* \* \*